April 16, 1946.  D. O. HENDRIX  2,398,708
PROCESS OF MAKING OPTICAL ELEMENTS
Filed Sept. 13, 1941  3 Sheets-Sheet 1
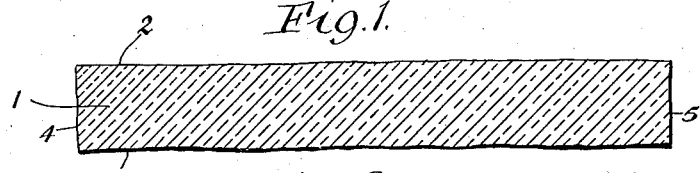
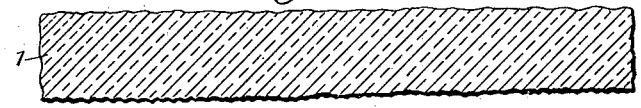
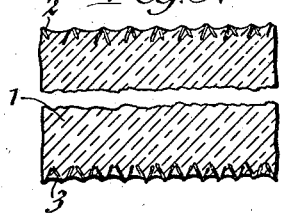
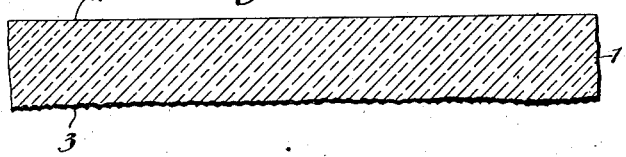
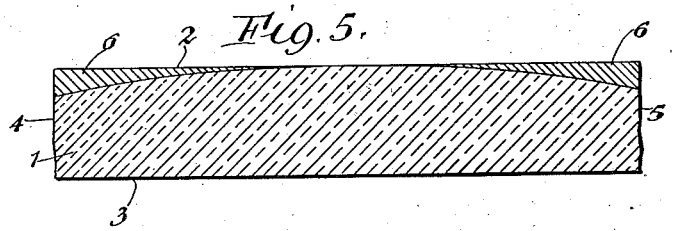
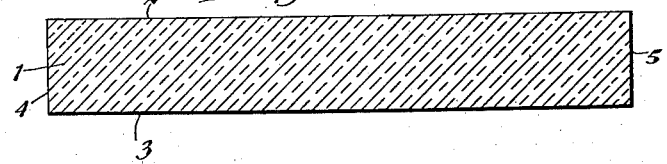
INVENTOR
DON O. HENDRIX
BY
ATTORNEY April 16, 1946.   D. O. HENDRIX   2,398,708
PROCESS OF MAKING OPTICAL ELEMENTS
Filed Sept. 13, 1941   3 Sheets-Sheet 2

INVENTOR
DON O. HENDRIX
BY
Raymond A. Paquin
ATTORNEY

April 16, 1946. D. O. HENDRIX 2,398,708
PROCESS OF MAKING OPTICAL ELEMENTS
Filed Sept. 13, 1941 3 Sheets-Sheet 3
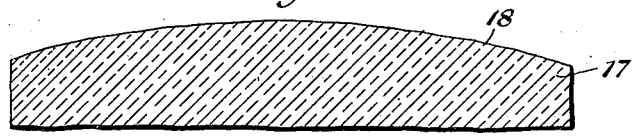
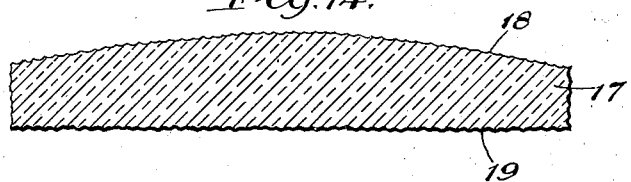
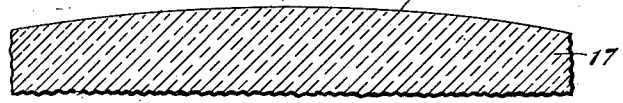
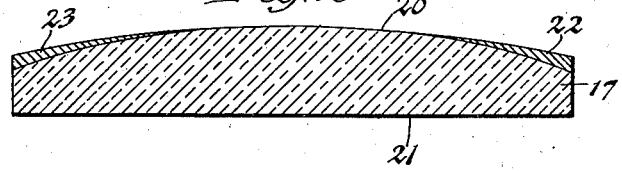
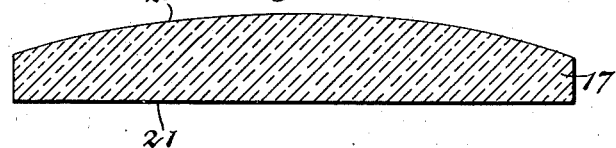
INVENTOR
DON O. HENDRIX
BY
ATTORNEY Patented Apr. 16, 1946

2,398,708

UNITED STATES PATENT OFFICE 2,398,708

PROCESS OF MAKING OPTICAL ELEMENTS

Don O. Hendrix, Kenmore, N. Y., assignor, by mesne assignments, to American Optical Company, Southbridge, Mass., a voluntary association Application September 13, 1941, Serial No. 410,758

3 Claims. (Cl. 41—42)

This invention relates to a new and improved process of making optical elements including lenses, prism, plates, mirrors, etc., and to the optical elements so produced.

An object of the invention is to provide a new and improved process for the manufacture of precision optical elements which will make the manufacture thereof simpler, more efficient and more economical.

Another object of the invention is to provide a new and improved method of making precision optical elements which will facilitate the manufacture thereof and therefore reduce the cost thereof.

Another object of the invention is to provide a new and improved process for making precision optical elements which will provide greater accuracy of the surfaces of said elements.

Another object of the invention is to provide an optical element which is the result of said process.

Other objects and advantages of the invention will be apparent from the following description taken in connection with the accompanying drawings and it will be understood that many changes may be made in the details of construction, arrangement of parts and steps of the process without departing from the scope of the invention as set forth in the accompanying claims. I therefore do not wish to be limited to the exact details of construction, arrangements of parts and steps of the process shown and described, as the preferred form and process have been set forth by way of illustration only.

Referring to the drawings:

Fig. 1 is a sectional view of a molded or pressed blank for the making of a mirror parallel plate;

Fig. 2 is a view similar to Fig. 1 but showing both of the surfaces rough ground;

Fig. 3 is a fragmentary enlarged view of Fig. 2;

Fig. 4 is a view similar to Fig. 2 but showing one of the surfaces polished;

Fig. 5 is a view similar to Fig. 4 but showing both of the surfaces polished;

Fig. 6 is a view similar to Fig. 5 but showing the finished product;

Fig. 13 is a view similar to Fig. 1 but showing a plano-convex lens;

Fig. 14 is a view similar to Fig. 13 but showing the both surfaces rough ground;

Fig. 15 is a view similar to Fig. 14 but showing one of the surfaces polished;

Fig. 16 is a view similar to Fig. 15 but showing both of the surfaces polished; and Fig. 17 is a view similar to Fig. 16 but showing the finished article.

Figure 7:
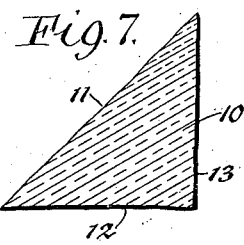
Fig. 7 is a sectional view showing a molded or pressed blank for making a right angle prism.

In the manufacture of precision optical parts in the past there have been two methods employed. One of these methods consisted in rough grinding and fine grinding all of the surfaces and then in the polishing, alternating between the various surfaces until the work was finished, that is, polishing a short while on one side, then polishing a short while on another, and so on, and then going back to the first side and continuing until the job was finished.

Another method of finishing an optical element was to rough and fine grind all of the surfaces and then polish one surface and then another, and so on, and then going back and correcting the first polished surface to compensate for change in the curvature thereof during the polishing of the second surface. Both of these processes were complicated and expensive.

I have found that a ground surface consists of a fracture complex consisting of cracks or crevices leading into the body of the glass and that such cracks and crevices are held open by debris due to the grinding process. This causes strain and causes the surface to become more convex than otherwise. Thus, when a plurality of surfaces are fabricated in the prior art manner, the strain is relieved in each surface by polishing each successive surface, but because of this strain each of the preceding surfaces is caused to deviate from the desired curvature which has been ground thereon.

I have found that if after the molded blank is rough ground and fine ground up to the finest emery, that if the blank is then treated by dipping in a solution as hereinafter described and then followed by grinding each surface with the finest emery and polishing each surface as ground, that the dipping or treating will remove the debris from the cracks and crevices and that the surfaces may be polished successively without compensating the first polished surfaces for changes in the curvature thereof during the polishing of the later surfaces, and therefore making the forming of precision optical elements simpler, more efficient and more economical.

This process is applicable to mirrors and flat plates, prisms and lenses, for example, parallel plates, right angle prisms, roof prisms, and spherical plano-convex, concavo-convex, cylindrical and other forms of lenses. That is, it is applicable to the manufacture of any precision optical element.

Referring more particularly to the drawings wherein similar reference characters designate corresponding parts throughout, the form of the invention shown in Figs. 1 to 6 inclusive, that is, a flat or parallel plate or mirror comprises a body portion of glass 1 having the upper surface 2, lower surface 3 and end surfaces 4 and 5.

In making such a flat or parallel plate, a piece of glass is placed in a mold and then by heat and pressure a molded blank or pressing is made. This blank or pressing is of the approximate size and shape of the desired finished article but with tolerance or allowances made in the thickness and size to allow for the grinding of the desired surfaces thereon.

The upper and lower surfaces 2 and 3 of this molded blank or pressing are then rough ground as shown in Fig. 2.

The upper and lower surfaces 2 and 3 are then fine ground up to the last grade of emery.

As stated above, in the prior art the next step was to polish one surface such as the surface 2 shown in Fig. 4 and then polish the surface 3 as shown in Fig. 5. This polishing of the surface 3 as shown in Fig. 5 would, because of the debris and particles of glass, etc., in the cracks and crevices as described above, cause strain to be set up in the blank and the surface 2 to change or warp as shown in Fig. 5. Fig. 3 is an enlarged fragmentary view of the blank shown in Fig. 2 with the surfaces ground and showing on a greatly enlarged scale the cracks and crevices formed by the grinding operation. It is these cracks and crevices in which the debris becomes lodged which leads to an expansion of the surface. In Fig. 5 the portions 6 show the warpage or change of curvature of said surface 2. The size of the section 6 has of course been exaggerated in Fig. 5 for the purpose of illustration.

As described above it was necessary in the prior art to regrind the surface 2 to again get such surface 2 to the desired flatness to obtain a flat or parallel plate as shown in Fig. 6. However, I have found that if, when the blank has been rough and fine ground up to the point of the last grade of emery as shown in Fig. 2, that if the semi-finished blank is then dipped into a satisfactory mixture, that the mixture will eliminate the debris or particles of glass, etc., and etch the surfaces of the cracks or crevices, allowing pieces of the abrasive material or other debris therein to be emitted and removes any strain on the surfaces of the glass and allows the surfaces to be polished in succession without setting up the strain or warpage shown in Fig. 5 and as found in the prior art, and it does not require the necessity of repolishing the surface 2 to form it of the proper flatness after the surface 3 has been polished. Thus, if the blank is dipped into a satisfactory mixture the strain would be eliminated and therefore the surfaces may be polished in succession to the proper flatness.

I have found that practically any acid or combination of acids which does not leave a deposit will be satisfactory, for example, a mixture of hydrofluoric and sulphuric acids with one part of hydrofluoric to five parts of sulphuric acid will work very satisfactorily.

For certain kinds of glass, it might also be possible to etch or treat the blank with an alkali solution, such as a flint glass will etch more with a strong alkali solution than with an acid. For example, with flint glass borax may be used.

The amount of time that the blanks are allowed to remain in the solution depends of course entirely upon the strength of the solution. With the hydrochloric and sulphuric acid solutions given above, I have found that allowing the blank to remain in the solution for a period of 10 minutes has worked satisfactorily.

In employing the invention with right angle prisms, as shown in Figs. 7 to 12 inclusive, or with other prisms wherein the steps of the process would be the same, the blank 10 is molded or pressed as described above for the flat or parallel plate method and the three surfaces 11, 12 and 13 of the blank 10 are then rough ground and fine ground up to the finest grade of emery as described above in connection with Fig. 2.

Figure 10:
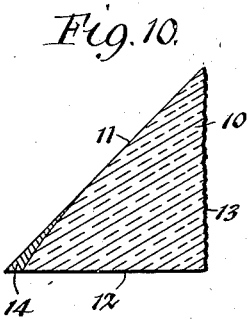
Fig. 10 is a view similar to Fig. 9 but showing still another surface polished.
Figure 11:
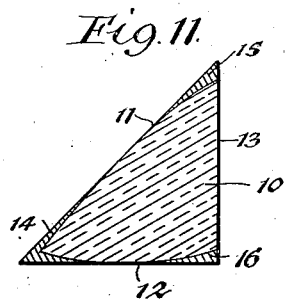
Fig. 11 is a view similar to Fig. 10 but showing all three surfaces polished.
Figure 12:
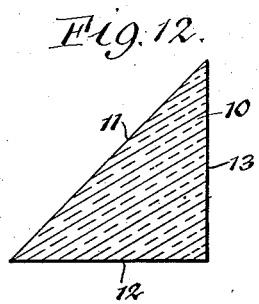
Fig. 12 is a view similar to Fig. 11 but showing the finished article.

By following the prior art methods, the surface 11 would then be polished and then the surface 12. The polishing of the surface 12 would cause warpage or change of curvature of the edge 14 of the surface 11 adjoining the surface 12, as shown in Fig. 10. By further following the prior art procedure and then polishing the surface 13, the portions of the surfaces 11 and 12 adjacent the surface 13 would be then warped or caused to change curvature because of the strain as set forth above, and as shown at 15 and 16 in Fig. 11, therefore making it necessary to repolish or otherwise compensate the surfaces 11 and 12 to obtain the desired flatness of surfaces on the surfaces 11, 12 and 13, as shown in Fig. 12.

Figure 8:
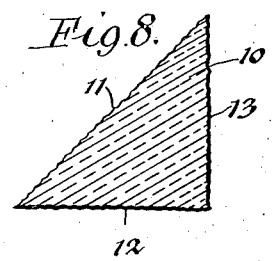
Fig. 8 is a view similar to Fig. 7 but showing the surfaces of the prism rough ground.
Figure 9:
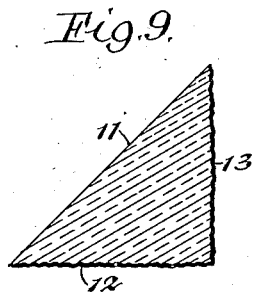
Fig. 9 is a view similar to Fig. 8 but showing one of the surfaces polished.

However, by employing the process of this invention the blank 10, as shown in Fig. 8, after having been rough ground and fine ground up to the point of the last grade of emery would be dipped or treated in a solution as set forth above for the parallel or flat plate type of element, and then the surfaces 11, 12 and 13 polished in any desired order, and because the particles and debris have been removed from the cracks and crevices as described above, the surfaces 11, 12 and 13 may be ground to the proper flatness without the necessity of refinishing the surfaces as described above in connection with the prior art methods.

In Figs. 13 to 17 inclusive the invention is shown as applied to a plano-convex type of lens element. It will be understood that the invention may be similarly applied to any other form of lens element such as concavo-convex or other desired curvatures.

With this form of lens element the blank 17 is pressed or molded to shape as described in connection with Figs. 1 and 7 above and the blank is then rough ground and fine ground up to the last degree of emery on both side surfaces 18 and 19.

With prior art processes the surface 20 would then be polished as shown in Fig. 15 and the opposite surface 21 would then be polished to desired curvature as shown in Fig. 16, which, because of the strain caused by the debris in the cracks and crevices as described above, will cause the surface 20 to warp or change its curvature as shown in Fig. 16 with the end portions thereof 22 and 23 departing from the desired curvature, making it necessary to refinish this surface to obtain the lens element of the desired curvature on said surface 20, as shown in Fig. 17.

However, I have found that if during the manufacture of such lens elements the steps of the process of this invention are followed, that this refinishing of the first polished surfaces can be avoided, that is, the blank is treated in the solution as described above in connection with the blank shown in Figs. 2 and 8 after the surfaces thereof have been rough ground and fine ground up to the last grade of emery and then the surfaces may be polished to desired curvature without any warpage or strain caused by the debris, etc., in the cracks and crevices as described above.

I have found that by employing the process described herein that the precision optical elements may be made more simply, more efficiently, and more economically than has been possible by prior art methods.

From the foregoing it will be seen that I have provided simple, efficient and economical means for obtaining all of the objects and advantages of the invention.

Having described my invention, I claim:

1. The method of making a precision optical element having accurately formed polished surfaces comprising forming a glass blank, rough grinding the optical surfaces thereof, fine grinding the optical surfaces thereof, treating chemically said optical surfaces with a material which will remove the debris from the cracks and crevices formed in said optical surfaces by the grinding operation and subsequently subjecting said optical surfaces to a polishing operation to provide said element with accurately formed polished optical surfaces.

2. The method of making a precision optical element having accurately formed polished surfaces comprising forming a glass blank, rough grinding the optical surfaces thereof, fine grinding the optical surfaces thereof, treating said optical surfaces with a mixture of hydrofluoric and sulphuric acids to remove the debris from the cracks and crevices formed by the grinding operation and subsequently subjecting said optical surfaces to a polishing operation to produce the desired optical contour on said surfaces.

3. The method of making a precision optical element having accurately formed polished surfaces comprising forming a glass blank, rough grinding the optical surfaces thereof, fine grinding the optical surfaces thereof, treating said optical surfaces with a mixture of hydrofluoric and sulphuric acids which will remove the debris from the cracks and crevices formed by the grinding operation and subsequently subjecting said optical surfaces to further fine grinding and polishing of each of said surfaces to produce the desired optical contour on said surfaces.

DON O. HENDRIX.